Figure 5:
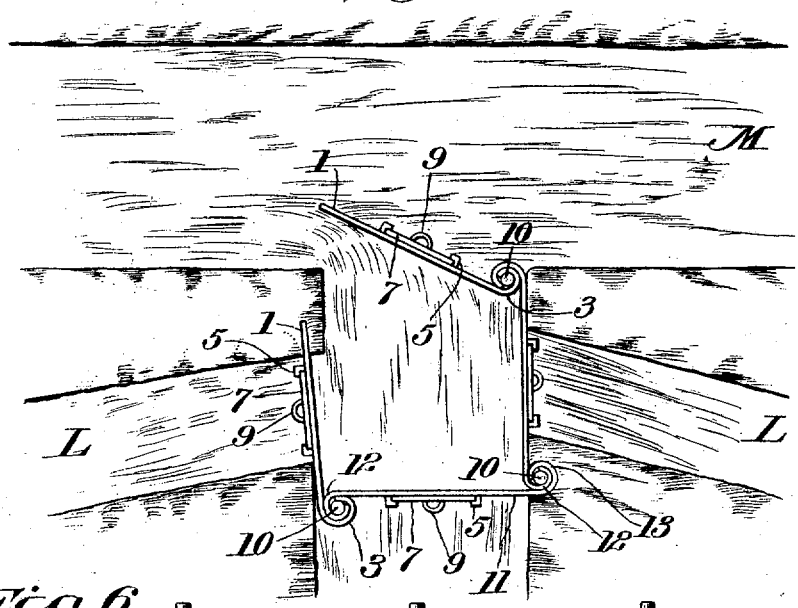

W. A. LINKLETTER.
FOLDING DAM FOR IRRIGATING DITCHES.
APPLICATION FILED MAY 29, 1913.
Reissued Sept. 30, 1913.
13,622.
2 SHEETS—SHEET 1.
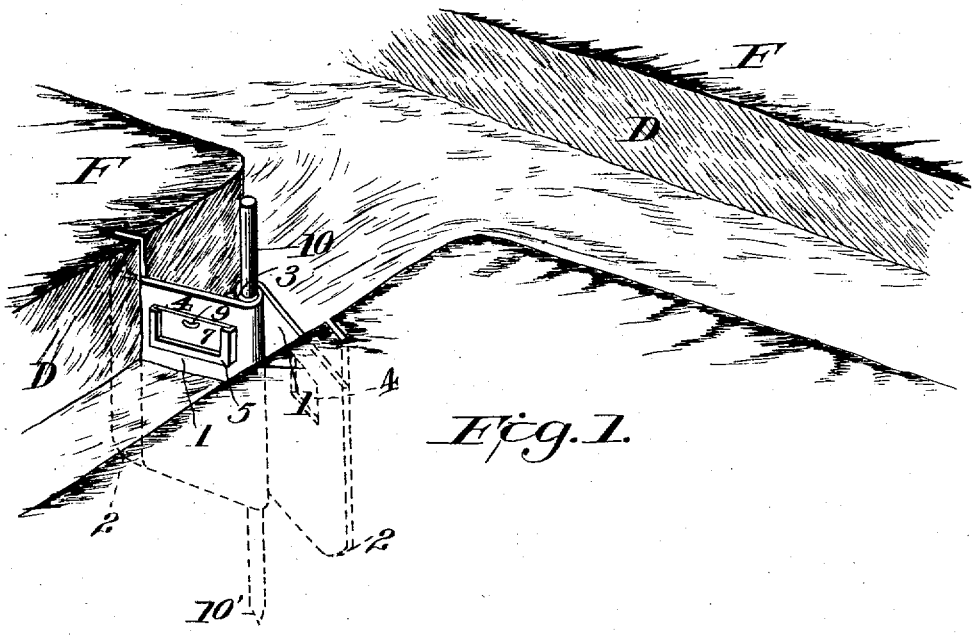
Fig. 1.
Fig. 2.
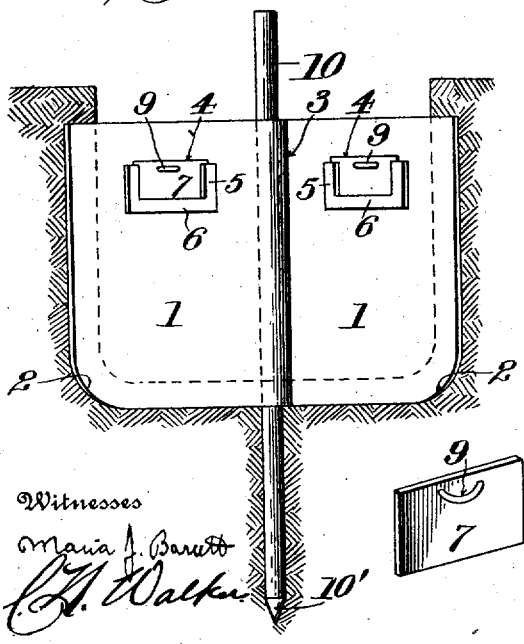
Fig. 3.
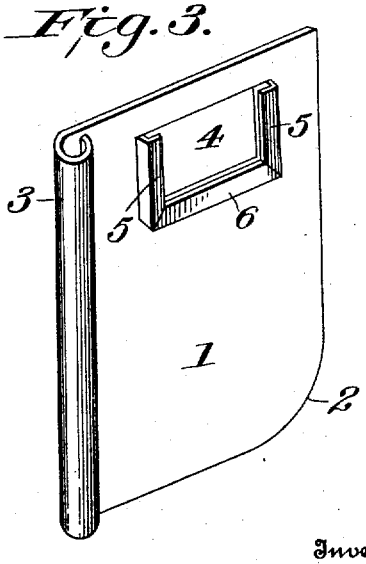
Fig. 4.
Witnesses
Maria J. Barrett
C. A. Walker
Inventor
Wm. A. Linkletter
By
F. E. Barrows
Attorney
COLUMBIA PLANOGRAPH CO., WASHINGTON, D. C.

W. A. LINKLETTER.

FOLDING DAM FOR IRRIGATING DITCHES.

APPLICATION FILED MAY 29, 1913.

Reissued Sept. 30, 1913. 13,622.

2 SHEETS—SHEET 2.

Witnesses

Maria J. Barrett

C. L. Walker

Inventor

Wm. A. Linkletter

By F. E. Barrows

Attorney

COLUMBIA PLANOGRAPH CO., WASHINGTON, D. C.

UNITED STATES PATENT OFFICE.

WILLIAM A. LINKLETTER, OF BOULDER, COLORADO.

FOLDING DAM FOR IRRIGATING-DITCHES.

13,622. Specification of Reissued Letters Patent. Reissued Sept. 30, 1913.

Original No. 1,059,174, dated April 15, 1913, Serial No. 708,891. Application for reissue filed May 29, 1913. Serial No. 770,780.

*To all whom it may concern:*

Be it known that I, WILLIAM A. LINKLETTER, a citizen of the United States, residing at Boulder, in the county of Boulder and State of Colorado, have invented certain new and useful Improvements in Folding Dams for Irrigating-Ditches; and I do declare the following to be a full, clear, and exact description of the invention, such as will enable others skilled in the art to which it appertains to make and use the same.

This invention relates to water distribution, and more especially to irrigating systems; and the object of the same is to produce a cheap and serviceable folding dam which can be conveniently transported to the point of use or from the same, and which has means for adjusting its width so that it can be used in ditches of a variety of widths within limits. This and other objects are accomplished by constructing the dam in the manner hereinafter more fully described and claimed, and as shown in the drawings, wherein:—

Figure 6:
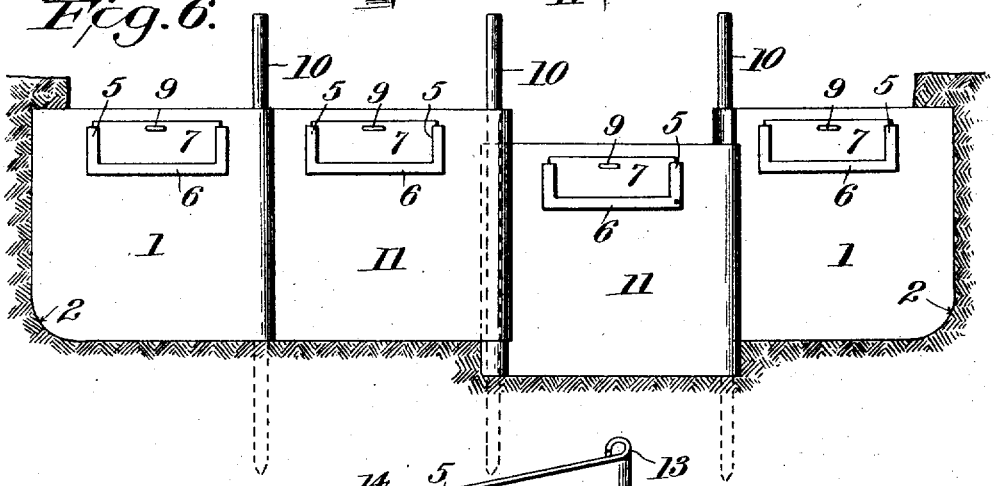
Figure 7:
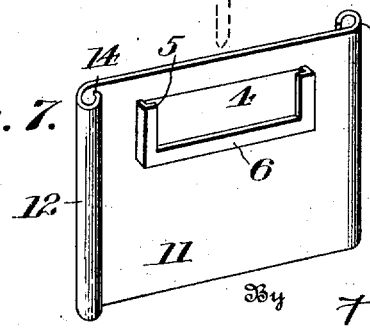

Figure 1 is a perspective view of a portion of a field with an irrigation ditch across it, showing one of my improved dams in use in such ditch; Fig. 2 is an elevation of a dam and the gates thereof; Fig. 3 is a detail of one of the leaves of the dam with its gate removed, and Fig. 4 is a detail of the gate and its handle; Fig. 5 is a plan view showing the use of an intermediate element whereby my invention is elaborated as hereinafter described; Fig. 6 is an elevation of a dam of considerable length made up of two intermediate elements and two end elements; Fig. 7 is a perspective detail of one of said intermediate elements.

In Fig. 1 of the drawings I have shown a field F with an irrigation ditch D across the same. Ordinarily the water is led along one side of the field and into a series of said ditches D which cross the field and are slightly inclined, so that the water flows down said ditches and the ground is irrigated sufficiently to produce crops. Occasions arise, however, where the water supply may be low or the nature of the soil may be such that it becomes desirable to retain the water longer within the ditches so that it may be absorbed by the land as the conditions require. According to the present invention, I construct a portable folding dam from sheet metal leaves which are substantial duplicates of each other and of a size convenient for handling and storage, the metal being by preference properly treated to prevent rust, and it is my intention that the farmer who must irrigate his land will keep on hand a number of these leaves and a number of poles for a purpose which will appear, so that when occasion arises where it is desirable to insert a dam or dams in one of his trenches, he can interlock a set or a pair of leaves, put a pole through the hinge between them, and carry the whole to the point of use and set it up in a few minutes. The preferred construction of my dam will now be described. Each end leaf 1 is substantially rectangular as shown and may be made in sizes, the smallest perhaps being about one foot wide by one foot high, and the largest much larger, with a possibility that there may be intermediate sizes. One corner of the body is by preference rounded off as at 2, and this corner will occupy one side of the bottom of the ditch. The opposite upright edge is rolled into a scroll or tube 3 throughout its entire length. Through the body 1 at a point near its upper end is cut an opening 4 whose side edges are preferably flanged as at 5 and whose lower edge is flanged as at 6, all these flanges producing guides for a gate 7 which may be a piece of sheet metal like the body 1 and by preference will have a handle 9 at its upper edge so that it can be raised to expose more or less of the opening. However, it is not essential that the leaves be provided with these openings and gates, but I prefer to employ them for purposes which will appear. Finally the numeral 10 designates a pole which in length will be about three times the height of the gate when finished, and will be sharpened at its lower end as at 10′.

A complete dam may be built up by assembling the parts mentioned. Two of the leaves are connected by slipping their rolls or scrolls into each other so that they will engage rather loosely, and by inserting a pole 10 through the hinge thus formed. The two leaves are then folded upon each other and the entire device placed in a wagon and carried to the point of use. Here the leaves are turned outward, either in strict alinement with each other across the ditch, or at an angle to each other if the ditch be narrower than the combined width of the two leaves; and the pointed lower end 10′ of the pole is embedded in the bottom of the ditch with the rounded corners 2 in the corners of the ditch, the side edges of the leaves being pushed down through the bank of the ditch and the lower edges of the two leaves being embedded in its bottom. By preference I would have the angle of the dam uppermost or presented toward the direction from which the water comes, so that the force of the water striking this dam will tend to push its side edges farther into the banks rather than to wash it out of place. By preference, also, I would have the guides and gates stand at the rear sides of the leaves, although this is not essential. As soon as one of these dams has been placed across a ditch wherein we will assume that the water is low, its flow along the ditch is checked, it rises within the ditch and percolates into the earth at either side thereof, and finally it may rise to the height of the openings through which it can be permitted to flow by raising the gates slightly and canting them within their guides so that they will stick or perhaps by removing them entirely. The water then passes along down the ditch to the next dam, if one be employed, where the operation is repeated. If now it should happen that the supply of water is suddenly increased, as by a local shower, nothing further will happen than that the water will flow down the ditch in such volume that it can not pass through the openings, and it must therefore rise a little higher and will flow over the dam and along to the next where the operation is repeated. At this time the rush of water has considerably more force, and the wisdom of disposing the dam as described will now be apparent, because its angular disposition will resist the force of the onrushing water. When the supply of water resumes its normal, being neither too great nor too little, one or more or all of the dams may be removed from position by simply pulling up the poles or stakes and then pulling up the leaves; the leaves are folded upon each other and the device thrown into the wagon and carried back to the point of storage. In the large sizes of this device, the longitudinal separation of the rolls at the points where the leaves are hingedly connected with each other is of further advantage, in that—because the leaves are so heavy individually—it may be wise to transport them to the point of use separately, where the user first inserts a pole at the center of the ditch, then slips the roll of one leaf over the pole and presses this leaf into position, and finally slips the roll of the other leaf over the pole and into engagement with the roll of the first leaf and pushes this leaf into position. By this means a dam of considerable size could be set up by one workman, and the utility of the entire structure is made possible where it is built in large size, but ordinarily the ditches in irrigating systems are so small that the two leaves will fold upon each other and the entire dam can be handled by one man.

In Figs. 5, 6 and 7, I have shown an amplification or enlargement of the idea wherein three or more leaves are employed. The endmost of these leaves or sections are the same as those above described, and the roll is also the same. But the intermediate leaf or leaves each has a substantially rectangular flat body 11, preferably corresponding in general contour with the size of the other units, and both its opposite edges rolled into scrolls or tubes 12 and 13 standing on respectively opposite sides of the body and each open along its throat 14 next to the body, as in the other elements. These intermediate leaves may also have the gate openings and gates as above described, and whose description therefore need not be duplicated here. The use of the device when thus amplified is well illustrated in Fig. 5 which shows the main ditch M and several laterals L, certain of the leaves as closing some of the laterals, and one of the endmost leaves 1 acting as a gate to regulate the inlet or flow into another lateral while the other endmost leaf acts as a gate to divert some of the water from the main ditch M. It is quite possible to use one of the intermediate elements 11 for a gate at the end of a series of wings, and in fact it might be advisable to do so because its free end can then be held by the pole against displacement under the strength of the current of water.

In Fig. 6 is illustrated how one of the elements can be depressed to a lower level than the others, as when it is desired to permit water to flow over the upper edge of this element into the lateral across which it stands and thus dispense with the use of the gate. A dam made up of a number of intermediate elements and two end elements in accordance with this elaboration of my invention, might be built of sufficient length to span a brook or stream; and if the units were made larger in size, the dam might be used to span a large sized stream or a river.

The interengaging nature of the scrolls on each section is such that the dam can be built up section by section, the scroll of one section being telescoped into the scroll of the next, to form a tubular hinge, and so on, a pole being driven into the tubular hinge to hold the sections rigidly at the hinged point. When it is desired to remove such a dam made up of several sections, the sections can be removed one at a time, beginning at one end or at an intermediate point. In the case of a swiftly flowing stream the tubular nature of the hinge joints enables the sections of the dam to be arranged in a zigzag manner, so that the current strikes the sections at an angle and the sections and their securing poles reinforce each other. One or more of the intermediate sections can be depressed below the others to permit overflow at such sections.

The hinged engagement of the dam sections with each other permits streams and ditches of different sizes and contours to be adequately dammed without any change in the size of the dam sections. For by placing the sections at a greater or less angle to each other, a two section dam, for example, can be used to cross a ditch or stream the full width of the two sections or less than half as wide, while the nature of the interengaging tubular hinges is such that all material flow of water is stopped and also such that the dam can be held rigidly against displacement at such hinged points by the driven poles.

Having described my invention, what I claim as new and desire to secure by Letters Patent, is—

1. The herein described folding dam for irrigation ditches, the same made up of a series of sheet metal leaves, the meeting upright edges of contiguous leaves being rolled in relatively opposite directions into nearly complete cylindrical scrolls extending throughout the entire height of said leaves slidably, rotatably, and removably engaging each other, the outermost leaves of the series omitting these scrolls along their outer edges and having the lower corners of such edges rounded, and a series of round poles longer than the height of the leaves and disposed within the respective pairs of engaging scrolls with their lower ends adapted to be driven into the bottom of the ditch.

2. The herein described portable dam consisting of a series of sheet metal leaves, all having one upright edge rolled on one side thereof, and the intermediate leaves having both upright edges rolled on respectively opposite sides of the bodies thereof, to produce tubular hinge elements with which the like elements on the contiguous leaves are adapted to slidably and rotatably engage, and a pole passing through the innermost roll of each pair of engaging rolls.

3. The herein described portable dam consisting of a series of sheet metal leaves, all having one upright edge rolled on one side thereof and the intermediate leaves having both upright edges rolled to produce tubular hinge elements with which the like elements on the contiguous leaves are adapted to slidably and rotatably engage, the rolls on the intermediate leaves being disposed on respectively opposite sides of the bodies thereof and having their throats open next to said body, and upright fastening means passing through the innermost roll of each pair of engaged rolls, for the purpose set forth.

4. A sectional dam made up of sections hinged to each other at their vertical meeting edges and relatively movable into positions at different angles to each other about said hinged point, and means for holding said sections at said hinged point rigidly against displacement with respect to the bottom of the stream in which the dam is adapted to be placed, said means comprising a pole adapted to be driven into the bottom of said stream.

5. A sectional dam made up of sections hinged to each other at their meeting edges by means of interengaging tubular hinge elements and relatively movable into positions at different angles to each other and a pole freely slidable through said tubular hinge elements and adapted to be driven into the earth sufficiently to hold said sections rigidly against displacement at the hinged point.

6. A sectional dam comprising a pole adapted to be driven rigidly into the bottom of a ditch or stream, and dam sections provided with integral tubular hinge elements at their vertical edges surrounding said pole and independently slidable thereon and engaging each other to form a tubular hinge, said sections being held rigidly against displacement at the hinged point by said pole but being movable into positions at different angles to each other about said hinge.

In testimony whereof, I have hereunto set my hand this 26th day of May 1913.

WILLIAM A. LINKLETTER.

Witnesses:
W. N. White,
W. W. Potter.

Copies of this patent may be obtained for five cents each, by addressing the "Commissioner of Patents, Washington, D. C."